United States Patent
Ki et al.

(10) Patent No.: US 12,307,087 B2
(45) Date of Patent: May 20, 2025

(54) POLYMORPHIC COMPUTING ARCHITECTURE FOR COMPUTATIONAL STORAGE

(71) Applicant: Samsung Electronics Co., Ltd., Suwon-si (KR)

(72) Inventors: Yang Seok Ki, Palo Alto, CA (US); Yangwook Kang, San Jose, CA (US)

(73) Assignee: Samsung Electronics Co., Ltd., Yongin-si (KR)

(*) Notice: Subject to any disclaimer, the term of this patent is extended or adjusted under 35 U.S.C. 154(b) by 67 days.

(21) Appl. No.: 18/296,727

(22) Filed: Apr. 6, 2023

(65) Prior Publication Data

US 2024/0160347 A1 May 16, 2024

Related U.S. Application Data (60) Provisional application No. 63/425,954, filed on Nov. 16, 2022.

(51) Int. Cl.
*G06F 12/00* (2006.01)
*G06F 3/06* (2006.01)

(52) U.S. Cl.
CPC .......... *G06F 3/0604* (2013.01); *G06F 3/0631* (2013.01); *G06F 3/0685* (2013.01)

(58) Field of Classification Search
CPC .... G06F 3/0604; G06F 3/0631; G06F 3/0685; G06F 3/061; G06F 11/3409; G06F 11/3466; G06F 11/3612
See application file for complete search history.

(56) References Cited

U.S. PATENT DOCUMENTS

| | | | |
|---|---|---|---|
| 9,886,300 | B2 | 2/2018 | Nakatsu |
| 10,164,835 | B2 | 12/2018 | Ganesan et al. |
| 10,282,210 | B2 | 5/2019 | Tan et al. |
| 10,405,182 | B2 | 9/2019 | Lu et al. |
| 11,016,794 | B2 | 5/2021 | Jain et al. |
| 11,327,856 | B2 | 5/2022 | Fukuta et al. |
| 2015/0264139 | A1* | 9/2015 | Son ............... H04L 67/1001 709/208 |
| 2019/0146827 | A1 | 5/2019 | Yu et al. |
| 2020/0042366 | A1 | 2/2020 | Ganesh et al. |
| 2021/0389890 | A1 | 12/2021 | Trika |
| 2022/0035681 | A1 | 2/2022 | Aoki et al. |

(Continued)

FOREIGN PATENT DOCUMENTS

| | | |
|---|---|---|
| CN | 107844539 A | 3/2018 |
| CN | 108228318 A | 6/2018 |

(Continued)

OTHER PUBLICATIONS

EPO Extended European Search Report dated Apr. 3, 2024, issued in European Patent Application No. 23210010.7, 10 pages.

*Primary Examiner* — Shawn X Gu
(74) *Attorney, Agent, or Firm* — Lewis Roca Rothgerber Christie LLP (57) ABSTRACT

Provided is a method for data storage, the method including receiving, by a first storage device, information from a first group of resources for performing a first function on the first storage device using a first implementation, based on the first storage device including the first implementation and being associated with a second group of resources corresponding to the first group of resources.

20 Claims, 4 Drawing Sheets

(56) References Cited

U.S. PATENT DOCUMENTS

2022/0171648 A1 6/2022 Rodriguez et al.
2022/0206864 A1 6/2022 Nadathur et al.
2022/0342601 A1 10/2022 Daoud et al.

FOREIGN PATENT DOCUMENTS

EP 4036725 A1 8/2022
EP 4086747 A1 11/2022

* cited by examiner

| NS | Function | PU | MB/Watt | Peak Power | Interface | Instance |
|---|---|---|---|---|---|---|
| NSa /dev/nvme1/ns1 | Filter | ARM | 10 | 10 | Repo of A | Repo of A-1 |
| NSb /dev/nvme0/ns2 | Filter | ASIC | 100 | 10 | Repo of A | Repo of A-2 |
| NSc /dev/nvme0/ns3 | Gzip | ASIC | 50 | 10 | Repo of B | Repo of B-1 |
| NSd /dev/nvme0/ns1 | Filter | FPGA | 25 | 5 | Repo of A | Repo of A-1 |
| NSe /dev/nvme1/ns2 | Gzip | X86 | 1 | 100 | Repo of B | Repo of B-1 |

POLYMORPHIC COMPUTING ARCHITECTURE FOR COMPUTATIONAL STORAGE

CROSS-REFERENCE TO RELATED APPLICATION(S)

This application claims priority to, and benefit of, U.S. Provisional Application Ser. No. 63/425,954, filed on Nov. 16, 2022, entitled "POLYMORPHIC COMPUTING ARCHITECTURE FOR COMPUTATIONAL STORAGE," the entire content of which is incorporated herein by reference.

FIELD

One or more aspects of one or more embodiments according to the present disclosure relate to systems and methods for a polymorphic computing architecture for computational storage. As used herein, "polymorphic" refers to an ability to use different types of components interchangeably.

BACKGROUND

The present background section is intended to provide context only, and the disclosure of any embodiment or concept in this section does not constitute an admission that said embodiment or concept is prior art.

In the field of computer storage, a system may include a host and one or more storage device connected to (e.g., communicably coupled to) the host. Such computer storage systems have become increasingly popular, in part, for allowing many different users to share the computing resources of the system. Storage requirements have increased over time as the number of users of such systems and the number and complexity of applications running on such systems have increased.

Accordingly, there may be a need for methods, systems, and devices that are suitable for improving the use of storage devices in storage systems.

SUMMARY

Aspects of one or more embodiments of the present disclosure relate to computer storage systems, and provide improvements to computational storage.

According to one or more embodiments of the present disclosure, there is provided a method for data storage, the method including receiving, by a first storage device, information from a first group of resources for performing a first function on the first storage device using a first implementation, based on the first storage device including the first implementation and being associated with a second group of resources corresponding to the first group of resources.

The first implementation may be selected to perform the first function based on a performance or a power consumption associated with the first implementation.

The first group of resources may be a group of resources for providing an interface to one or more applications, and may be configured to manage first resources corresponding to the first function, and the second group of resources may be an instance group of resources configured to manage second resources for performing the first function using the first implementation, the second resources being different resources than the first resources.

The second group of resources may be configured to receive, from the first group of resources, the information for performing the first function on the first storage device using the first implementation.

A third group of resources associated with the first group of resources may be configured to receive, from the first group of resources, information for performing a second function using a second implementation that is different from the first implementation.

The first implementation may include an application-specific processing circuit and the second implementation may include a general-purpose processing circuit.

A third group of resources associated with the first group of resources may be configured to receive, from the first group of resources, information for performing a second function using a second storage device that is different from the first storage device.

The first implementation may include at least one of an application specific integrated circuit (ASIC), a field programmable gate array (FPGA), a graphics processing unit (GPU), a neural processing unit (NPU), an advanced reduced instruction set computing machine (ARM), or a complex instruction set computer (CISC).

The method may further include determining that the first implementation is capable of performing the first function more efficiently than a first processor or a second implementation, based on a table indicating performance characteristics associated with the first implementation or the second implementation, selecting the first implementation for performing the first function, and creating the second group of resources, based on a file stored in a storage.

According to one or more other embodiments of the present disclosure, there is provided a system for data storage, the system including a first storage device, and being configured to receive, by the first storage device, information from a first group of resources for performing a first function on the first storage device using a first implementation, based on the first storage device including the first implementation and being associated with a second group of resources corresponding to the first group of resources.

The first implementation may be selected to perform the first function based on a performance or a power consumption associated with the first implementation.

The first group of resources may be a group of resources for providing an interface to one or more applications, and may be configured to manage first resources corresponding to the first function, and the second group of resources may be an instance group of resources configured to manage second resources for performing the first function using the first implementation, the second resources being different resources than the first resources.

The second group of resources may be configured to receive, from the first group of resources, the information for performing the first function on the first storage device using the first implementation.

A third group of resources associated with the first group of resources may be configured to receive, from the first group of resources, information for performing a second function using a second implementation that is different from the first implementation.

The first implementation may include an application-specific processing circuit and the second implementation may include a general-purpose processing circuit.

A third group of resources associated with the first group of resources may be configured to receive, from the first group of resources, information for performing a second function using a second storage device that is different from the first storage device.

The first implementation may include at least one of an application specific integrated circuit (ASIC), a field programmable gate array (FPGA), a graphics processing unit (GPU), a neural processing unit (NPU), an advanced reduced instruction set computing machine (ARM), or a complex instruction set computer (CISC).

The system may be configured to determine that the first implementation is capable of performing the first function more efficiently than a first processor or a second implementation, based on a table indicating performance characteristics associated with the first implementation or the second implementation, select the first implementation for performing the first function, and create the second group of resources, based on a file stored in a storage.

According to one or more other embodiments of the present disclosure, there is provided a storage device, including a compute module configured to perform a function on the storage device, based on information received at the storage device from a group of resources, wherein the information is sent to the storage device based on the storage device, the compute module, and the group of resources being associated with an implementation for performing the function.

The storage device may include the group of resources.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown to facilitate a less obstructed view of these various embodiments and to make the description clear.

DETAILED DESCRIPTION

Aspects of the present disclosure and methods of accomplishing the same may be understood more readily by reference to the detailed description of one or more embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey aspects of the present disclosure to those skilled in the art. Accordingly, description of processes, elements, and techniques that are not necessary to those having ordinary skill in the art for a complete understanding of the aspects and features of the present disclosure may be omitted.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computer storage, a system may include a host and one or more storage devices communicably coupled to the host. The storage devices may be configured to perform functions for applications running on the host. For example, the storage devices may be computational storage devices. As used herein, a "computational storage device" is a storage device that includes a compute module (e.g., a processing circuit) in addition to a storage device controller. The compute module may include (e.g., may be) a general-purpose processor (e.g., a central processing unit (CPU)) or a function-specific circuit (e.g., an application specific integrated circuit (ASIC) or a field programmable gate array (FPGA)). The compute module may be configured to perform a function for the applications running on the host. For example, the system may be configured to enable the applications to select a storage-device method for performing a function, instead of a host-processor method for performing the function. For example, the storage-device method may be more efficient at performing the function than the host-processor method.

A storage device may include one or more implementations for performing a function. For example, one storage device may be configured to perform a compression operation using an ASIC, while another storage device may be configured to perform a compression operation using a general-purpose processor. Although the present disclosure discusses compression operations and scan operations, it should be understood that the present disclosure is not limited thereto. Compression operations and scan operations are two of the most common operations performed by computational storage devices. One or more aspects of one or more embodiments of the present disclosure may be used with any function performed by a storage device.

In other words, computational storage devices may be diverse and may provide various functions and implementations. Storage system users should be able to use a specific function regardless of vendors and implementations. One or more aspects of one or more embodiments of the present disclosure introduce a way to realize this goal using a microservice concept.

The microservice concept enables a flexible, polymorphic computing architecture for computational storage using a pair of containers. The pair of containers may decouple interfaces and their implementation. For example, the pair of containers may decouple device management and host management. In one or more embodiments, a first container of the pair, an "interface container" (e.g., a host container), may be responsible for implementing a generic infrastructure to present a consistent (e.g., a uniform) interface to applications, regardless of the underlying hardware and its capabilities (e.g., regardless of the underlying storage devices and their respective capabilities). The interface (e.g., the generic interface) may allow an application to reuse the interface consistently, even if a new storage device replaces an existing storage device. As used herein, a "container" (also referred to as a "group of resources") is a unit of computation and resources associated with an operating system (OS) that enable a specific functionality. For example, in some embodiments, a container is a package of software that includes all the resources and dependencies to run the software. In some embodiments, a container includes all the resources for performing computations using computational storage devices.

A second container of the pair, an "instance container" (e.g., a device container), may be configured to interact with the interface container and may be responsible for implementing specific mechanisms for a given device and a given function. For example, the instance container may be used to implement the interface semantics using the underlying hardware and the underlying hardware's functionality.

The instance container may be configured to run at the host or device, depending on a given storage device's capabilities. If the instance container runs at the host, then the container may be configured to control the storage device behavior. For example, if a storage device has non-volatile memory express (NVMe) capability (e.g., NVMe TP4091 capability), the instance container may be configured to include (e.g., to have) an implementation using the NVMe-based interfaces. On the other hand, if a storage device includes a general-purpose embedded CPU (e.g., an Advanced (Reduced Instruction Set Computing) RISC Machine (ARM) or a RISC-V), it may be configured to run the instance container inside the storage device. In this case, the host may be configured to communicate with the device by way of Remote Procedure Call (RPC).

If there is no special storage device or special functionality allowing for the instance container to run on the storage device, then both the instance container and the interface container may be configured to run at the host. Alternatively, the interface container may be configured to play a dual role of interface container and instance container. In one or more embodiments, there may be one instance container per each specific device and function. Alternatively, one instance container may be configured to support multiple devices and/or multiple functions. For example, a scan operation may be implemented using a host CPU, embedded CPUs, FPGA, ASIC, or a combination of these while a single set of scan interfaces may be used for any of these implementations. Thus, the interface container may be configured to provide a common microservice interface, and the instance container may be configured to implement the microservice based on the type of storage device and its capabilities.

In summary, one or more aspects of one or more embodiments of the present disclosure may provide a pair-of-containers architecture to implement functionalities. The architecture may provide a consistent interface to the applications, regardless of implementation while opening implementation optimization. For example, applications may be enabled to select from a variety of implementations having different performance characteristics to satisfy specific priorities (e.g., to meet a power budget metric or a latency metric) while interacting with just the interface container. Thus, the polymorphic computing architecture according to the present disclosure may provide flexibility, regardless of device capability and platform (e.g., application) environment, with easy deployment and use.

Figure 1:
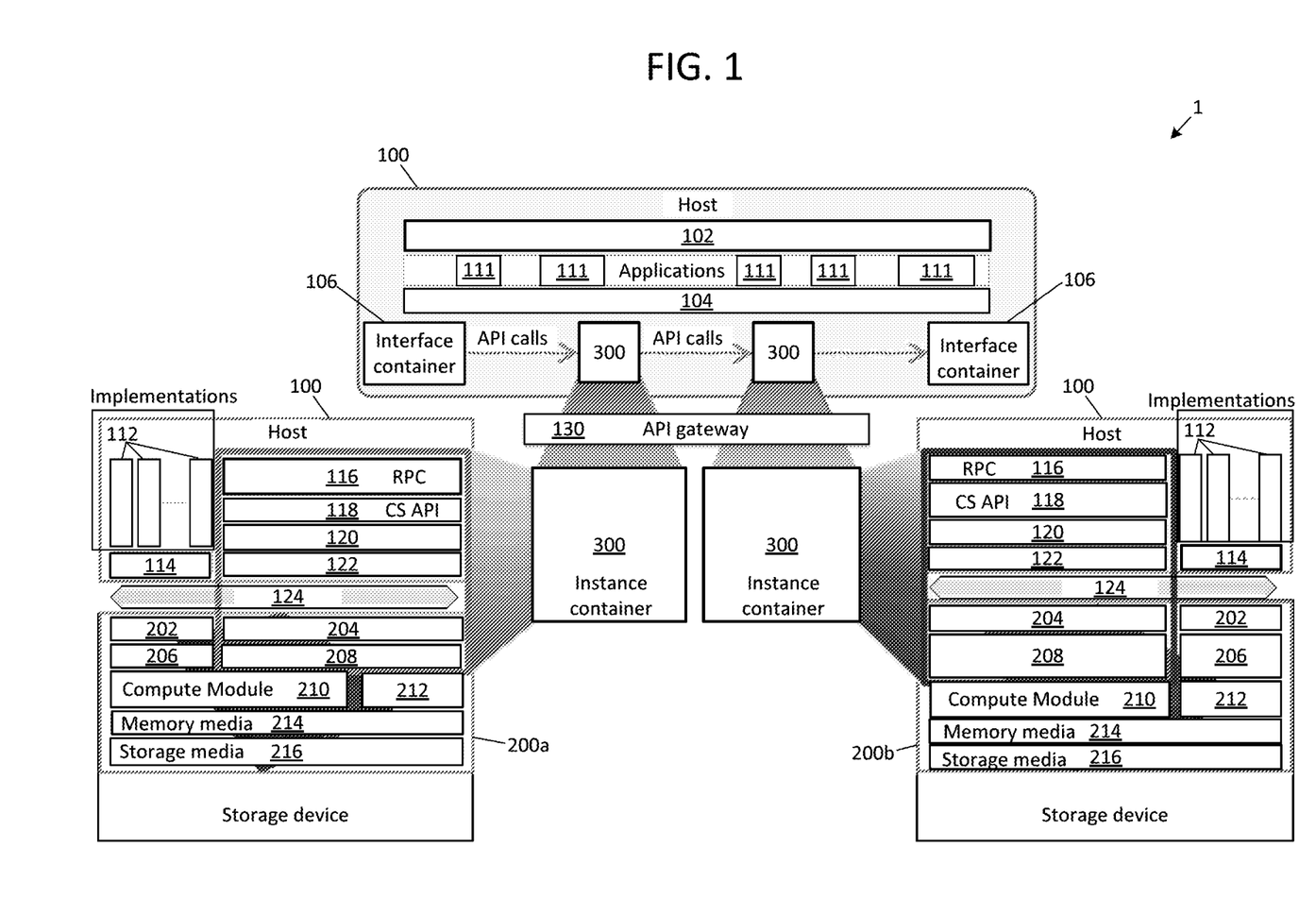
FIG. 1 is a system diagram depicting a polymorphic computing architecture for computational storage using interface and instance containers, according to one or more embodiments of the present disclosure.

FIG. 1 is a system diagram depicting a polymorphic computing architecture for computational storage using interface and instance containers, according to one or more embodiments of the present disclosure.

Referring to FIG. 1, a system 1 for computational storage may include a host 100 and one or more storage devices 200 (e.g., computational storage devices) (individually depicted as 200a and 200b) connected (e.g., communicably coupled) to the host 100. In one or more embodiments, the storage devices 200 may be connected to the host 100 through a communications link 124. The communications link 124 may include, or may be implemented by way of, a variety of technologies. For example, the communications link 124 may be compatible with one or more of the following protocols: Representational State Transfer (REST)/inter-process communication (IPC)/RPC over NVMe/NVMe over Fabrics (NVMe-oF)/Compute Express Link (CXL)/Peripheral Component Interconnect Express (PCIe)/Remote Direct Memory Access (RDMA)/Transmission Control Protocol (TCP)/Internet Protocol (IP), etc.

The host 100 may include a host processor (not illustrated). For example, the host processor may be a central processing unit (CPU) or a Graphics Processing Unit (GPU). The host 100 may include one or more applications 111 running on the host 100. For example, the applications 111 may run on the host processor of the host 100. The host processor may be configured to perform functions for the applications 111. The applications 111 may be configured to communicate with an end user by way of an end-user interface 102 (e.g., an end-user computing interface). The applications 111 may communicate with one or more interface containers 106 (or "host tasks" or "host containers") on the host 100 by way of an application programming interface (API) gateway 130. The applications 111 may be configured to request a host-performed function or a storage-device-performed function. In one or more embodiments the applications 111 may request a storage-device performed function by passing information for performing the function through the API gateway 130 (which may also be referred to simply as an "API"). In one or more embodiments, the applications 111 may communicate with the API gateway 130 by way of one or more stub interfaces 104 (e.g., design pattern stub interfaces). The API gateway 130 may be configured to communicate with one or more interface containers 106 (e.g., host containers) on the host 100. The API gateway 130 may be configured to determine whether an interface container 106 and/or an instance container 300 are available for performing a given requested function (e.g., whether the containers have already been downloaded for use on the system 1). If the interface container 106 and the instance container 300 are available on the system 1, the API gateway 130 may call the requested function for the application 111. As will be discussed in further detail below, a given interface container 106 may be configured to provide a common microservice interface to the applications 111. A given interface container 106 may also be configured to manage resources in the host OS for performing a specific function. For example, a given host interface container 106 may be configured to interact with corresponding instance containers 300 to perform a compression operation. Another given host interface container 106 may be configured to provide a common microservice interface for an application 111 to request a scan operation.

Any given function may be provided by way of one or more implementations 112. For example, one implementation of a compression operation may be implemented by way of a dedicated compute module 210 that is an ASIC of the first storage device 200a. Another implementation of the compression operation may be implemented by way of a general-purpose compute module that is an ARM processor of the first storage device 200a or of a second storage device 200b. In some embodiments, one or more implementations 112 may include one or more of an ASIC, an FPGA, a GPU, an NPU, an ARM, or a CISC.

The interface container 106 may be configured to communicate with (e.g., make API calls to) one or more instance containers 300 (e.g., storage device containers) to cause a given function to be performed with any one of one or more implementations 112 provided by the storage devices 200. In the case of a function that is implemented by way of a dedicated compute module 210, the corresponding instance container 300 may be a prebuilt container. For example, a prebuilt container may include (e.g., may be) hardware that is prebuilt by a vendor of the storage device. In the case of a function that is implemented by way of a general-purpose compute module 210, the corresponding instance container 300 may be a custom container. For example, the host 100 may be configured to download any program into a general-purpose compute module 210 and run the program. The host 100 may be configured to communicate with the storage devices 200 by way of device drivers 114.

Any given instance container 300 may be configured to manage device resources (e.g., storage device resources) and computation for a given implementation 112. In other words, a given instance container 300 may be responsible for managing the device-specific (e.g., storage-device-specific) mechanisms for performing a specific function using a specific implementation 112 on a storage device 200. The instance container may be configured to run on the host 100 or on a storage device 200, depending on the corresponding storage device capabilities. For example, if an instance container 300 runs at the host 100, then the instance container 300 may be configured to control the behavior of the corresponding storage device 200. In one or more embodiments, if a storage device 200 is configured for a specific protocol (e.g., NVMe TP4091 capability), the corresponding instance container 300 may be configured to have an implementation using an interface that is compatible with the specific protocol (e.g., NVMe-based interfaces). On the other hand, if a storage device 200 has a general-purpose compute module 210 (e.g., an embedded CPU like ARM or RISC-V), the storage device 200 may be configured to run the corresponding instance container 300 inside the storage device 200. In such embodiments that use a general-purpose compute module 210, the host may be configured to communicate with the storage device 200 by way of a Remote Procedure Call (RPC) client 116.

In one or more embodiments, one or more storage devices 200 may include one or more of the following components. The storage device 200 may include storage media 216. For example, the storage media 216 may include (e.g., may be) a non-volatile memory for storing data. The storage device 200 may include a storage device controller 212 for managing access to the storage media 216. The storage device 200 may include memory media 214. The memory media 214 may include (e.g., may be) a volatile memory including a data cache. The storage device 200 may be configured to communicate with the host 100 by way of an NVMe interface 202. The storage device 200 may include firmware 206 for performing one or more functions of the storage device 200.

In one or more embodiments, one or more instance containers 300 may include one or more of the following components. The instance container 300 may include an RPC client 116 for communicating between the host 100 and the storage device 200. The instance container 300 may include a computational storage (CS) API 118 for providing standardized access to the storage device 200. The instance container 300 may include a CS library 120 including device specific code. The instance container 300 may include a CS device driver 122 for communicating between the host 100 and the storage device 200. The instance container 300 may include an NVMe CS interface 204. The instance container 300 may include an RPC server 208 (e.g., an RPC server in Sandbox). For example, storage devices 200 may run the RPC server 208 internally to service instance containers 300 or to receive requests from other entities, including the interface containers 106, instance containers 300, storage devices 200, and hosts 100. The RPC server 208 may run in a sandbox such as virtual machines, to protect the storage devices 200 from RPC server crashes or vulnerabilities. The RPC server 208 may handle multiple protocols over hardware interfaces, including REST, IPC, RPC, and TCP/IP protocols and NVMe, CXL, PCIe, RDMA, ethernet, and wireless network interfaces.

Figure 2A:
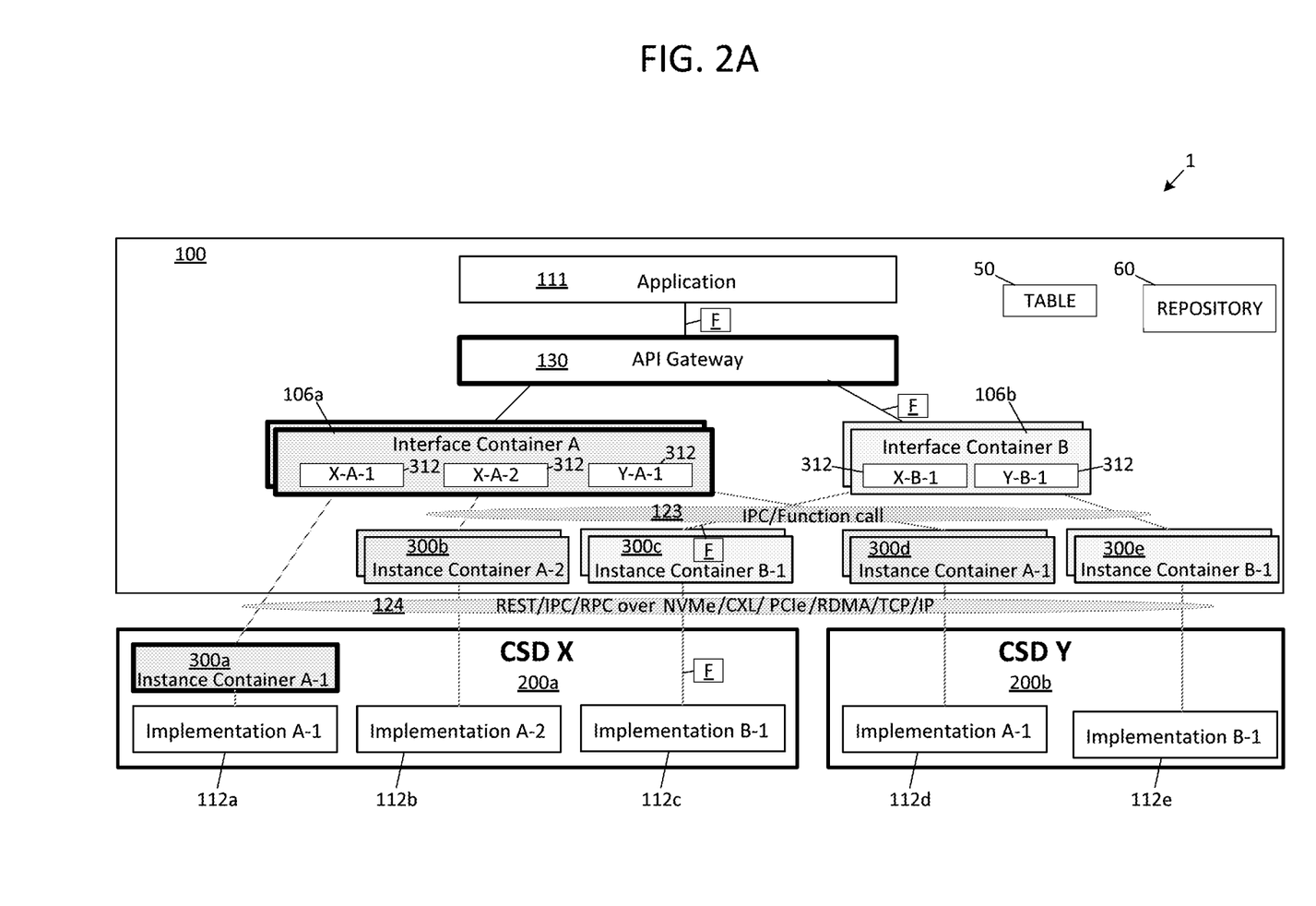
FIG. 2A is a system diagram for describing a process flow within a system for computational storage using interface containers and instance containers, according to one or more embodiments of the present disclosure.

FIG. 2A is a system diagram for describing a process flow within a system 1 for computational storage using interface containers 106 and instance containers 300, according to one or more embodiments of the present disclosure.

Figure 2B:
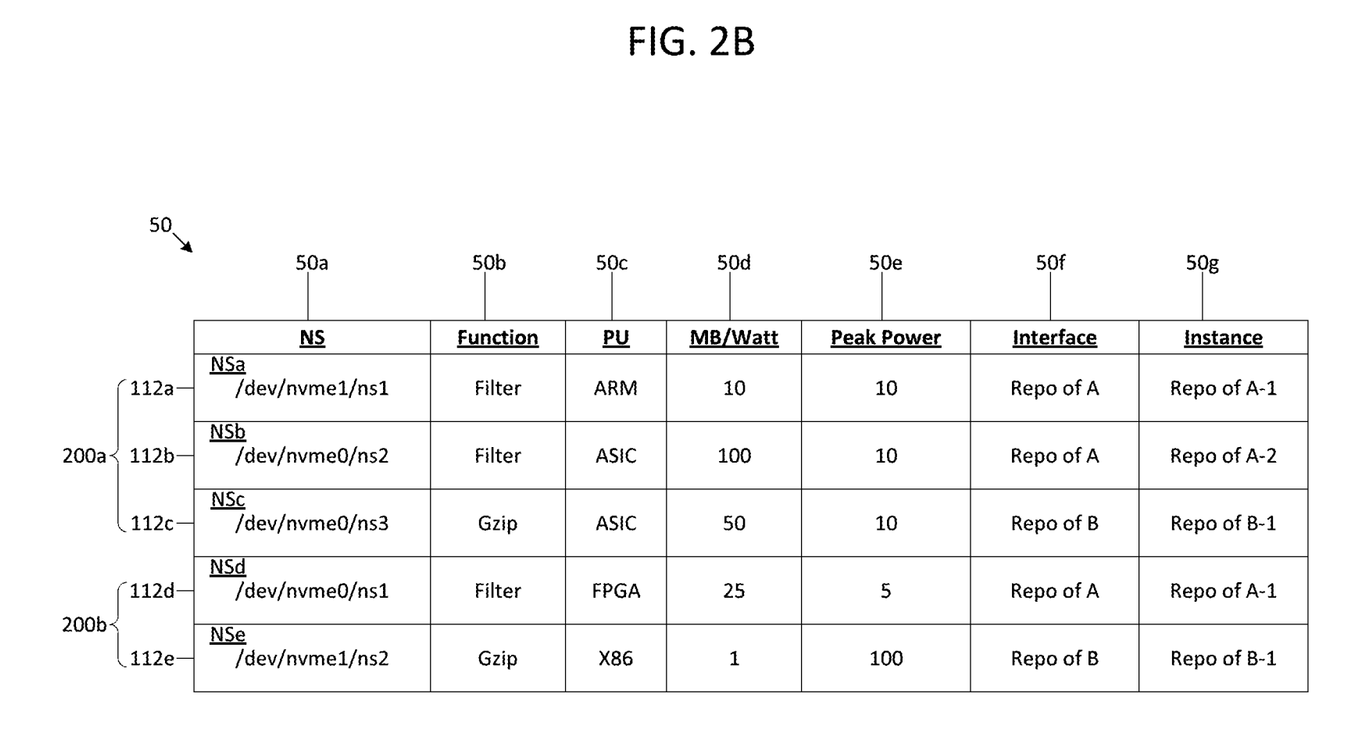
FIG. 2B is a diagram depicting a table for use in a system for computational storage using interface containers and instance containers, according to one or more embodiments of the present disclosure.

FIG. 2B is a diagram depicting a table 50 for use in a system 1 for computational storage using interface containers 106 and instance containers 300, according to one or more embodiments of the present disclosure.

Referring to FIG. 2A, aspects of one or more embodiments of the present disclosure provide systems and methods to allow applications 111 running on a host 100 to use functions provided by storage devices 200 (e.g., computational storage devices) (individually depicted as 200a and 200b) by way of an interface that remains consistent regardless of changes to the underlying storage devices 200 and regardless of how the functions may be implemented on the storage devices 200.

The system 1 may provide pairs of containers to implement a polymorphic computing architecture. For example, each pair of containers may include an interface container 106 on the host 100 and an instance container 300 on either the host 100 or one of the storage devices 200. The container pairs may decouple an interface between the applications 111 and the storage devices 200. As discussed above, interface containers 106 (individually depicted as 106a and 106b) may provide common microservice interfaces to the applications 111 and may manage host-side computation and host-side resources. The instance containers 300 (individually depicted as 300a-300e) may manage device-side computation and device-side resources while implementing specific microservices based on the capabilities of a specific storage device 200. In one or more embodiments, each interface container 106 may include one or more plugins 312 corresponding to a respective instance container 300. The plugins may provide APIs that allow the applications 111 to execute a specific implementation on a storage device 200 through an instance container 300, instead of the applications 111 directly accessing the storage device 200 that contains the data to process and execute an implementation on the storage device 200. For example, to execute implementation 112a on data stored on a namespace (e.g., namespace NSa depicted in FIG. 2B) associated with implementation 112a, an application 111 may first send a query to an API gateway 130 and receive a location of interface container 106a and the namespace associated with implementation 112a (e.g., namespace NSa depicted in FIG. 2B). The application 111 may then call the API provided by a plugin 312 (depicted in FIG. 2A as "X-A-1") associated with implementation 112a on interface container 106a to access Interface container 300a. Implementation 112a may be called by instance container 300a, and the results may be sent back to the application 111.

As an example of a process flow, a first storage device 200a of the system 1 may be configured to perform a first function using a first implementation 112c. The first function may be a compression algorithm (e.g., a Gzip compression algorithm), and the first implementation 112c may include (e.g., may be) an ASIC that is configured to perform the compression algorithm (see FIG. 2B). A second storage device 200b of the system 1 may be configured to perform the first function using a second implementation 112e. For example, the second implementation 112e may be a general-purpose processor (e.g., an x86 microprocessor) that is configured to perform the compression algorithm (e.g., the Gzip compression algorithm) (see FIG. 2B). Performance characteristics associated with the first implementation 112c and performance characteristics associated with the second implementation 112e may be stored in a table 50 (e.g., a storage device function directory) (see FIG. 2B). The table 50 may also provide details for a location (e.g., a repository) storing container files for creating a specific instance container 300c to perform the first function using the first implementation 112c.

An application 111 running on the host 100 may refer to the table 50 and may select the first implementation 112c based on determining that the function may be performed more efficiently by using the first implementation 112c than by using the second implementation 112e. The application 111 may send a request to an API gateway 130 on the host 100 to compress a file F using the first implementation 112c. The API gateway 130 may determine whether container files for performing the first function using the first implementation 112c have already been downloaded for use on the system 1. If the container files have not been downloaded, the API gateway 130 may cause the host 100 to download the container files. The container files may be stored in one or more repositories 60. In one or more embodiments the one or more repositories 60 may be located on the host 100. In one or more embodiments, the one or more repositories may be managed by a management entity. If the container files have been downloaded, the API gateway 130 may call the function for the application 111, based on the selected implementation.

The API gateway 130 may send information for performing the first function to an interface container 106b associated with the first function. For example, the interface container 106b may manage host-side resources and computation for performing compression algorithms corresponding to a variety of implementations 112 (e.g., using different storage devices and different types of processing units). The interface container 106b may, in turn, send information for performing the first function to an instance container 300c, based on the instance container 300c corresponding to the first implementation 112c. For example, the file F may be sent from the interface container 106b to the instance container 300c. The instance container 300c may manage device-side resources and computation for performing the compression algorithm (e.g., for compressing file F) using the first implementation 112c.

In one or more embodiments, the interface containers 106 may be configured to communicate with their corresponding instance containers 300 by way of an IPC/function call 123. In one or more embodiments, the instance containers 300 may be configured to communicate with their respective storage devices 200 by way of a communications link 124 (as discussed above).

Accordingly, the applications 111 may be enabled to use a variety of storage device functions corresponding to a variety of implementations 112a-112e by interacting with a generalized API (e.g., the API gateway 130) and interface containers 106a and 106b, while the device-specific details are implemented by the instance containers 300a-300e.

Referring to FIG. 2B, the table 50 discussed above with respect to FIG. 2A may comprise information for selecting a specific implementation from one of the implementations 112a-112e. For example, a first column 50a depicted in the table 50 may list namespaces NS, on the storage devices 200, corresponding to each of the specific implementations 112a-112e. That is, each implementation 112 available on a storage device 200 may be provided based on a namespace NS corresponding to a specific storage device 200. For example, the first implementation 112c (as discussed above with respect to FIG. 2A) may correspond to a first namespace NSc associated with the first storage device 200a. The second implementation 112e may correspond to a second namespace NSe associated with the second storage device 200b. A second column 50b depicted in the table 50 may list specific functions associated with each implementation 112. A third column 50c depicted in the table 50 may list specific processing units associated with each implementation 112. For example, and referring to columns 50b and 50c, implementation 112a may be an ARM processor configured to perform a filter function of a scan operation; implementation 112b may be an ASIC configured to perform a filter function of a scan operation; implementation 112c may be an ASIC configured to perform a compression algorithm (e.g., a GZip algorithm); implementation 112d may be an FPGA configured to perform a filter function of a scan operation; and implementation 112e may be an X86 microprocessor configured to perform a compression algorithm (e.g., a GZip algorithm). A fourth column 50d depicted in the table 50 may list specific performance characteristics associated with each implementation 112. For example, the performance characteristics may include a performance per watt (e.g., an average performance per power consumption in megabytes (MB)/Watt) associated with each respective implementation 112, where a higher performance characteristic value may correspond to a more efficient performance characteristic. In some embodiments, the performance characteristics may include floating point operations per second (FLOPS/s), MB/s, or etc, depending on the application. A fifth column 50e depicted in the table 50 may list specific peak power consumption characteristics associated with each implementation 112. The performance characteristics and peak power consumption characteristics may be used to determine which implementations may be utilized to satisfy a priority associated with the system 1. For example, the priority may include a power budget (e.g., a power budget associated with the host 100 and/or one or more storage devices 200) or a latency requirement. A sixth column 50f depicted in the table 50 may be an interface column, listing specific repositories (e.g., locations) for interface containers 106 associated with each implementation 112. A seventh column 50g depicted in the table 50 may be an instance column, listing specific repositories for instance containers 300 associated with each implementation 112. For example, the interface column and the instance column may identify specific locations for container files (e.g., container images) for configuring the system 1 to perform specific functions.

Figure 3:
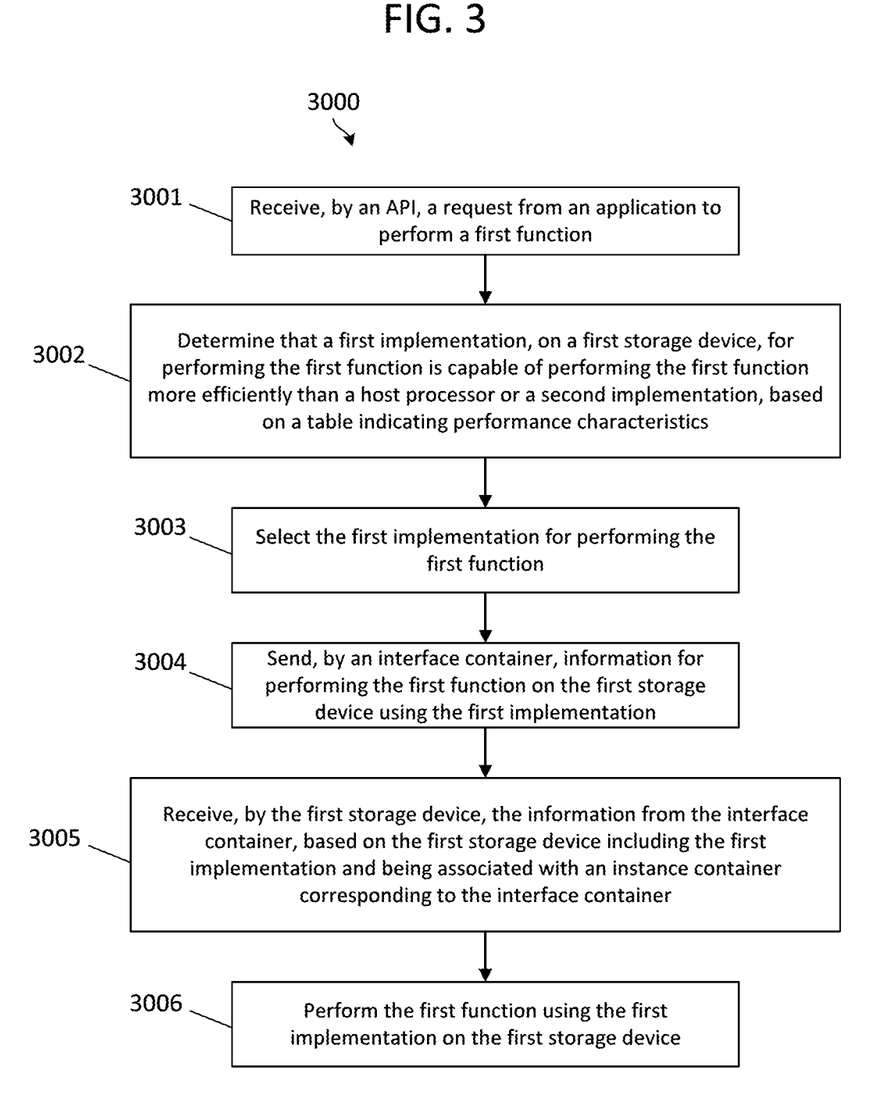
FIG. 3 is a flowchart depicting a method for using a polymorphic computing architecture for computational storage, according to one or more embodiments of the present disclosure.

FIG. 3 is a flowchart depicting a method 3000 for using a polymorphic computing architecture for computational storage, according to one or more embodiments of the present disclosure.

Referring to FIG. 3, the method 3000 may include the following example operations. An API gateway 130 (see FIG. 2A) on a host 100 may receive a request from an application 111 to perform a first function (3001). The application 111 may determine that a first implementation 112 on a first storage device 200 for performing the first function is capable of performing the first function more efficiently than a host processor or more efficiently than a second implementation 112, based on referring to a table 50 indicating performance characteristics (operation 3002). The application 111 may select the first implementation 112 for performing the first function (operation 3003). The application 111 may interact with an interface container 106 (e.g., a first group of resources) corresponding to the first function and may cause the interface container 106 to send information for performing the first function on the first storage device 200 using the first implementation 112 to an instance container 300 (e.g., a second group of resources) of the first storage device 200 corresponding to the interface container 106 (operation 3004). The first storage device 200 may receive the information from the interface container 106, based on the first storage device 200 including the first implementation and being associated with the instance container 300 (operation 3005). The first storage device 200 may perform the first function using the first implementation 112 (operation 3006).

Accordingly, one or more aspects of one or more embodiments of the present disclosure may provide improvements to computational storage systems by providing a general interface to applications by way of an interface container and configuring device-specific implementations by way of an instance container.

Example embodiments of the disclosure may extend to the following statements, without limitation:

Statement 1. An example method includes: receiving, by a first storage device, information from a first group of resources for performing a first function on the first storage device using a first implementation, based on the first storage device including the first implementation and being associated with a second group of resources corresponding to the first group of resources.

Statement 2. An example method includes the method of statement 1, wherein the first implementation is selected to perform the first function based on a performance or a power consumption associated with the first implementation.

Statement 3. An example method includes the method of any of statements 1 and 2, wherein the first group of resources is a group of resources for providing an interface to one or more applications, and is configured to manage first resources corresponding to the first function, and the second group of resources is an instance group of resources configured to manage second resources for performing the first function using the first implementation, the second resources being different resources than the first resources.

Statement 4. An example method includes the method of any of statements 2 and 3, wherein the second group of resources is configured to receive, from the first group of resources, the information for performing the first function on the first storage device using the first implementation.

Statement 5. An example method includes the method of any of statements 1-4, wherein a third group of resources associated with the first group of resources is configured to receive, from the first group of resources, information for performing a second function using a second implementation that is different from the first implementation.

Statement 6. An example method includes the method of statement 5, wherein the first implementation comprises an application-specific processing circuit and the second implementation comprises a general-purpose processing circuit.

Statement 7. An example method includes the method of any of statements 1-4, wherein a third group of resources associated with the first group of resources is configured to receive, from the first group of resources, information for performing a second function using a second storage device that is different from the first storage device.

Statement 8. An example method includes the method of any of statements 1-4, wherein the first implementation comprises at least one of an application specific integrated circuit (ASIC), a field programmable gate array (FPGA), a graphics processing unit (GPU), a neural processing unit (NPU), an advanced reduced instruction set computing machine (ARM), or a complex instruction set computer (CISC).

Statement 9. An example method includes the method of any of statements 1-4 and further includes determining that the first implementation is capable of performing the first function more efficiently than a first processor or a second implementation, based on a table indicating performance characteristics associated with the first implementation or the second implementation, selecting the first implementation for performing the first function, and creating the second group of resources, based on a file stored in a storage.

Statement 10. An example system for performing the method of any of statements 1-9 includes the first storage device and the second storage device.

Statement 11. An example device includes a compute module configured to perform the first function of any of statements 1-4, based on the information received from the first group of resources.

Statement 12. An example device includes the device of statement 11 and includes the first group of resources.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims and their equivalents.

What is claimed is:

1. A method for data storage, the method comprising:
receiving, by a first storage device, information from a first group of resources for performing a first function on the first storage device using a first implementation, based on the first storage device comprising the first implementation and being associated with a second group of resources corresponding to the first group of resources,
the second group of resources being configured to manage second resources for performing the first function using the first implementation.

2. The method of claim 1, wherein the first implementation is selected to perform the first function based on a performance or a power consumption associated with the first implementation.

3. The method of claim 1, wherein:
the first group of resources is a group of resources for providing an interface to one or more applications, and is configured to manage first resources corresponding to the first function; and
the second group of resources is an instance group of resources different from the first resources.

4. The method of claim 1, wherein the second group of resources is configured to receive, from the first group of resources, the information for performing the first function on the first storage device using the first implementation.

5. The method of claim 1, wherein a third group of resources associated with the first group of resources is configured to receive, from the first group of resources, information for performing a second function using a second implementation that is different from the first implementation.

6. The method of claim 5, wherein the first implementation comprises an application-specific processing circuit and the second implementation comprises a general-purpose processing circuit.

7. The method of claim 1, wherein a third group of resources associated with the first group of resources is configured to receive, from the first group of resources, information for performing a second function using a second storage device that is different from the first storage device.

8. The method of claim 1, wherein the first implementation comprises at least one of an application specific integrated circuit (ASIC), a field programmable gate array (FPGA), a graphics processing unit (GPU), a neural processing unit (NPU), an advanced reduced instruction set computing machine (ARM), or a complex instruction set computer (CISC).

9. The method of claim 1, further comprising:
determining that the first implementation is capable of performing the first function more efficiently than a first processor or a second implementation, based on a table indicating performance characteristics associated with the first implementation or the second implementation;
selecting the first implementation for performing the first function; and
creating the second group of resources, based on a file stored in a storage.

10. A system for data storage, the system comprising a first storage device, and being configured to receive, by the first storage device, information from a first group of resources for performing a first function on the first storage device using a first implementation, based on the first storage device comprising the first implementation and being associated with a second group of resources corresponding to the first group of resources,
the second group of resources being configured to manage second resources for performing the first function using the first implementation.

11. The system of claim 10, wherein the first implementation is selected to perform the first function based on a performance or a power consumption associated with the first implementation.

12. The system of claim 10, wherein:
the first group of resources is a group of resources for providing an interface to one or more applications, and is configured to manage first resources corresponding to the first function; and
the second group of resources is an instance group of resources different from the first resources.

13. The system of claim 10, wherein the second group of resources is configured to receive, from the first group of resources, the information for performing the first function on the first storage device using the first implementation.

14. The system of claim 10, wherein a third group of resources associated with the first group of resources is configured to receive, from the first group of resources, information for performing a second function using a second implementation that is different from the first implementation.

15. The system of claim 14, wherein the first implementation comprises an application-specific processing circuit and the second implementation comprises a general-purpose processing circuit.

16. The system of claim 10, wherein a third group of resources associated with the first group of resources is configured to receive, from the first group of resources, information for performing a second function using a second storage device that is different from the first storage device.

17. The system of claim 10, wherein the first implementation comprises at least one of an application specific integrated circuit (ASIC), a field programmable gate array (FPGA), a graphics processing unit (GPU), a neural processing unit (NPU), an advanced reduced instruction set computing machine (ARM), or a complex instruction set computer (CISC).

18. The system of claim 10, configured to:
determine that the first implementation is capable of performing the first function more efficiently than a first processor or a second implementation, based on a table indicating performance characteristics associated with the first implementation or the second implementation;
select the first implementation for performing the first function; and
create the second group of resources, based on a file stored in a storage.

19. A storage device, comprising a compute module configured to perform a function on the storage device, based on information received at the storage device from a first group of resources,
wherein the information is sent to the storage device based on the storage device, the compute module, the first group of resources, and a second group of resources being associated with an implementation for performing the function,
the second group of resources being configured to manage second resources for performing the function using the implementation.

20. The storage device of claim 19, comprising the second group of resources.

* * * * *